(12) United States Patent
Liu et al.

(10) Patent No.: US 8,810,544 B2
(45) Date of Patent: Aug. 19, 2014

(54) TOUCH SENSING METHOD AND ELECTRONIC APPARATUS USING THE SAME

(75) Inventors: Jui-Ming Liu, Tainan (TW); Chung-Wen Chang, Tainan (TW); Shen-Feng Tai, Tainan (TW); Feng-Wei Yang, Tainan (TW)

(73) Assignee: Himax Technologies Limited, Tainan (TW)

( * ) Notice: Subject to any disclaimer, the term of this patent is extended or adjusted under 35 U.S.C. 154(b) by 122 days.

(21) Appl. No.: 13/272,970

(22) Filed: Oct. 13, 2011

(65) Prior Publication Data

US 2013/0093711 A1 Apr. 18, 2013

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04106* (2013.01)
USPC .......................... 345/174; 345/173; 178/18.06

(58) Field of Classification Search
CPC ....... G06F 3/041; G06F 3/044; G06F 3/0416; G06F 3/0418; G06F 2203/04106; H03K 17/96; H03K 17/962; H03K 17/9622; G01R 27/26; G01R 27/2605
USPC ................... 345/173–178; 178/18.01–18.11; 200/512; 340/407.1; 327/517; 324/686
See application file for complete search history.

(56) References Cited

U.S. PATENT DOCUMENTS

| | | | |
|---|---|---|---|
| 8,723,827 B2 * | 5/2014 | Wright et al. ................. | 345/173 |
| 2006/0097991 A1 | 5/2006 | Hotelling et al. | |
| 2006/0232567 A1 | 10/2006 | Westerman et al. | |
| 2009/0309851 A1 * | 12/2009 | Bernstein ...................... | 345/174 |
| 2011/0025629 A1 * | 2/2011 | Grivna et al. ................. | 345/173 |
| 2011/0050614 A1 * | 3/2011 | Lin et al. ....................... | 345/173 |
| 2011/0175835 A1 * | 7/2011 | Wang ............................. | 345/173 |
| 2011/0261006 A1 * | 10/2011 | Joharapurkar et al. ....... | 345/174 |
| 2011/0310051 A1 * | 12/2011 | Souchkov ..................... | 345/174 |
| 2012/0113047 A1 * | 5/2012 | Hanauer et al. ............... | 345/174 |
| 2012/0154324 A1 * | 6/2012 | Wright et al. ................. | 345/174 |

(Continued)

FOREIGN PATENT DOCUMENTS

| | | |
|---|---|---|
| TW | 201101142 | 1/2011 |
| TW | 201126401 | 8/2011 |

OTHER PUBLICATIONS

"Office Action of Taiwan Counterpart Application", issued on Mar. 21, 2014, p1-p4, in which the listed references were cited.

*Primary Examiner* — Dwayne Bost
*Assistant Examiner* — Darlene M Ritchie
(74) *Attorney, Agent, or Firm* — J.C. Patents (57) ABSTRACT

A touch sensing method adapted for an electronic apparatus including a touch panel is provided. A touch sensing method includes the following steps: obtaining a mutual-mode data by sensing a gesture applied on the touch panel in a mutual capacitance mode during a first period of a sensing frame; obtaining a self-mode data by sensing the gesture applied on the touch panel in a self capacitance mode during a second period of the sensing frame; and determining a touch location associated with the gesture on the touch panel based on the self-mode data or the mutual-mode data. Furthermore, an electronic apparatus to which the foregoing touch sensing method is applied is also provided.

8 Claims, 6 Drawing Sheets

(56) References Cited

U.S. PATENT DOCUMENTS

| | | | |
|---|---|---|---|
| 2012/0176179 A1* | 7/2012 | Harders et al. | 327/517 |
| 2012/0200524 A1* | 8/2012 | Vallis et al. | 345/174 |
| 2012/0235950 A1* | 9/2012 | Chen et al. | 345/174 |
| 2012/0249449 A1* | 10/2012 | Tseng et al. | 345/173 |
| 2012/0299869 A1* | 11/2012 | Hung et al. | 345/174 |
| 2013/0307823 A1* | 11/2013 | Grivna et al. | 345/174 |
| 2013/0314109 A1* | 11/2013 | Kremin et al. | 324/686 |
| 2014/0035871 A1* | 2/2014 | Karpin et al. | 345/174 |

* cited by examiner

Mutual capacitance mode under normal status

TOUCH SENSING METHOD AND ELECTRONIC APPARATUS USING THE SAME

BACKGROUND OF THE INVENTION

1. Field of the Invention

The invention relates to a sensing method and an electronic apparatus using the same, and more particularly relates to a touch sensing method and an electronic apparatus using the same.

2. Description of Related Art

In this information era, reliance on electronic products is increasing day by day. Electronic products including notebook computers, mobile phones, personal digital assistants (PDAs), digital walkmans, and so on are indispensable in our daily lives. Each of the aforesaid electronic products has an input interface for a user to input his or her command, such that an internal system of each of the electronic product spontaneously runs the command. At this current stage, the most common input interface includes a keyboard and a mouse.

From the user's aspect, it is sometimes rather inconvenient to use the conventional input interface including the keyboard and the mouse. Manufacturers aiming to resolve said issue thus start to equip the electronic products with touch input interfaces, e.g. touch pads or touch panels, so as to replace the conditional keyboards and mice. At present, the users' commands are frequently given to the electronic products by physical contact or sensing relationship between users' fingers or styluses and the touch input interfaces.

For a smart phone, capacitive touch input interfaces are usually highly sensitive, and battery charging is an important topic. The transformer with a USB core is commonly used for battery charging. However, charging voltages from an AC power supply easily bring AC noise into a touch sensing controller of the smart phone which results in error points reported. Accordingly, how to prevent the touch sensing controller from reporting error points is one of the important issues at present.

SUMMARY OF THE INVENTION

The invention is directed to a touch sensing method capable of preventing the touch controller from reporting error points.

The invention is directed to an electronic apparatus capable of preventing the touch controller from reporting error points.

The invention provides a touch sensing method adapted for an electronic apparatus including a touch panel. The touch sensing method includes the following steps: obtaining a mutual-mode data by sensing a gesture applied on the touch panel in a mutual capacitance mode during a first period of a sensing frame; obtaining a self-mode data by sensing the gesture applied on the touch panel in a self capacitance mode during a second period of the sensing frame; and determining a touch location associated with the gesture on the touch panel based on the self-mode data or the mutual-mode data.

In an embodiment of the invention, the touch sensing method further includes the following step: determining whether the electronic apparatus is connected to an alternating-current (AC) power supply. If the electronic apparatus is not connected to the AC power supply, the touch location associated with the gesture on the touch panel is determined based on the mutual-mode data.

In an embodiment of the invention, if the electronic apparatus is connected to the AC power supply, the touch sensing method further includes the following step: determining whether the self-mode data and the mutual-mode data are equivalent. If the self-mode data and the mutual-mode data are equivalent, the touch location associated with the gesture on the touch panel is determined based on the mutual-mode data.

In an embodiment of the invention, if the self-mode data and the mutual-mode data are not equivalent, the touch location associated with the gesture on the touch panel is determined based on the self-mode data.

The invention provides an electronic apparatus including a touch panel and a touch sensing controller. The touch panel includes a plurality of sensing blocks and senses a gesture applied thereon based on capacitive variations of the sensing blocks. The touch panel senses the gesture applied on the touch panel in a mutual capacitance mode during a first period of a sensing frame and senses the gesture applied on the touch panel in a self capacitance mode during a second period of the sensing frame. The touch sensing controller is connected to the touch panel and determines a touch location associated with the gesture on the touch panel based on the self-mode data or the mutual-mode data.

In an embodiment of the invention, the touch sensing controller further determines whether the electronic apparatus is connected to an alternating-current (AC) power supply, and if the electronic apparatus is not connected to the AC power supply, the touch sensing controller determines the touch location associated with the gesture on the touch panel based on the mutual-mode data.

In an embodiment of the invention, if the electronic apparatus is connected to the AC power supply, the touch sensing controller determines whether the self-mode data and the mutual-mode data are equivalent, and if the self-mode data and the mutual-mode data are equivalent, the touch sensing controller determines the touch location associated with the gesture on the touch panel based on the mutual-mode data.

In an embodiment of the invention, if the self-mode data and the mutual-mode data are not equivalent, the touch sensing controller determines the touch location associated with the gesture on the touch panel based on the self-mode data.

In an embodiment of the invention, the first period is longer than the second period in the sensing frame.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
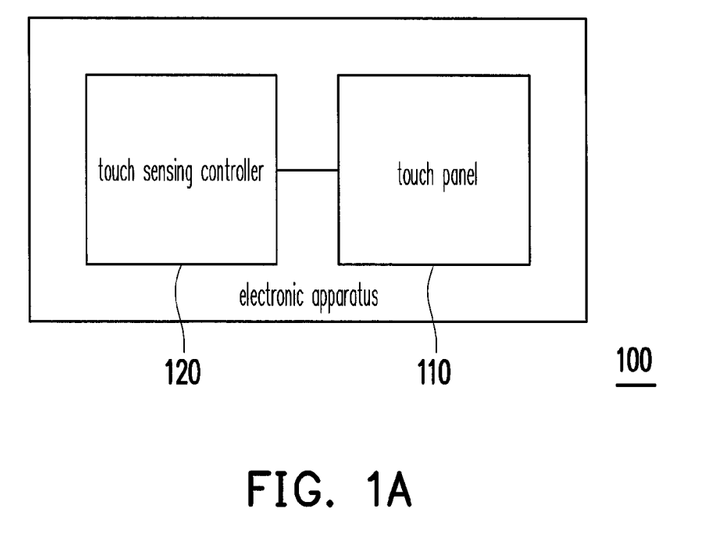
FIG. 1A shows a block diagram of an electronic apparatus according to an embodiment of the invention.

FIG. 1A shows a block diagram of an electronic apparatus according to an embodiment of the invention. Referring to FIG. 1A, the electronic apparatus 100 of the present embodiment has multi-touch function for sensing users' gestures and includes a touch panel 110 and a touch sensing controller 120. The touch panel 110 is configured to sense users' gestures applied thereon, and the touch sensing controller 120 is connected to the touch panel 110 and configured to control the electronic apparatus 100 to perform various functions associated with the users' gestures. In order to prevent the touch controller 120 from reporting error touch locations, a touch sensing method combining a self capacitance mode and a mutual capacitance mode is adopted for sensing users' gestures in the electronic apparatus 100.

Figure 1B:
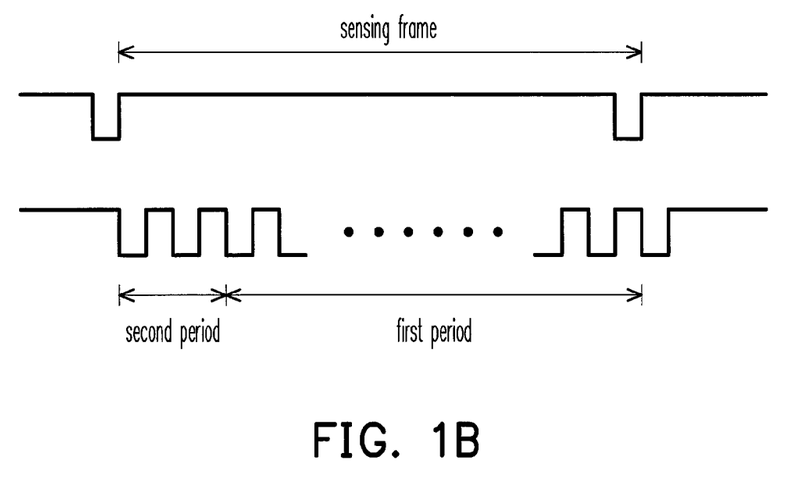
FIG. 1B shows a timing diagram of each sensing according to an embodiment of the invention.

FIG. 1B shows a timing diagram of each sensing according to an embodiment of the invention. Referring to FIG. 1A and FIG. 1B, the touch panel 110 of the present embodiment senses users' gestures in a mutual capacitance mode during a first period of each sensing frame and senses the users' gestures in a self capacitance mode during a second period of each sensing frame. In the present embodiment, the first period is longer than the second period in the sensing frame.

Herein, the electronic apparatus 100 may be a portable product (e.g. a mobile phone, a camcorder, a camera, a laptop computer, a game player, a watch, a music player, an e-mail receiver and sender, a map navigator, a digital picture, or the like), an audio-video product (e.g. an audio-video player or the like), a screen, a television, a bulletin, or a panel in a projector.

Figure 2:
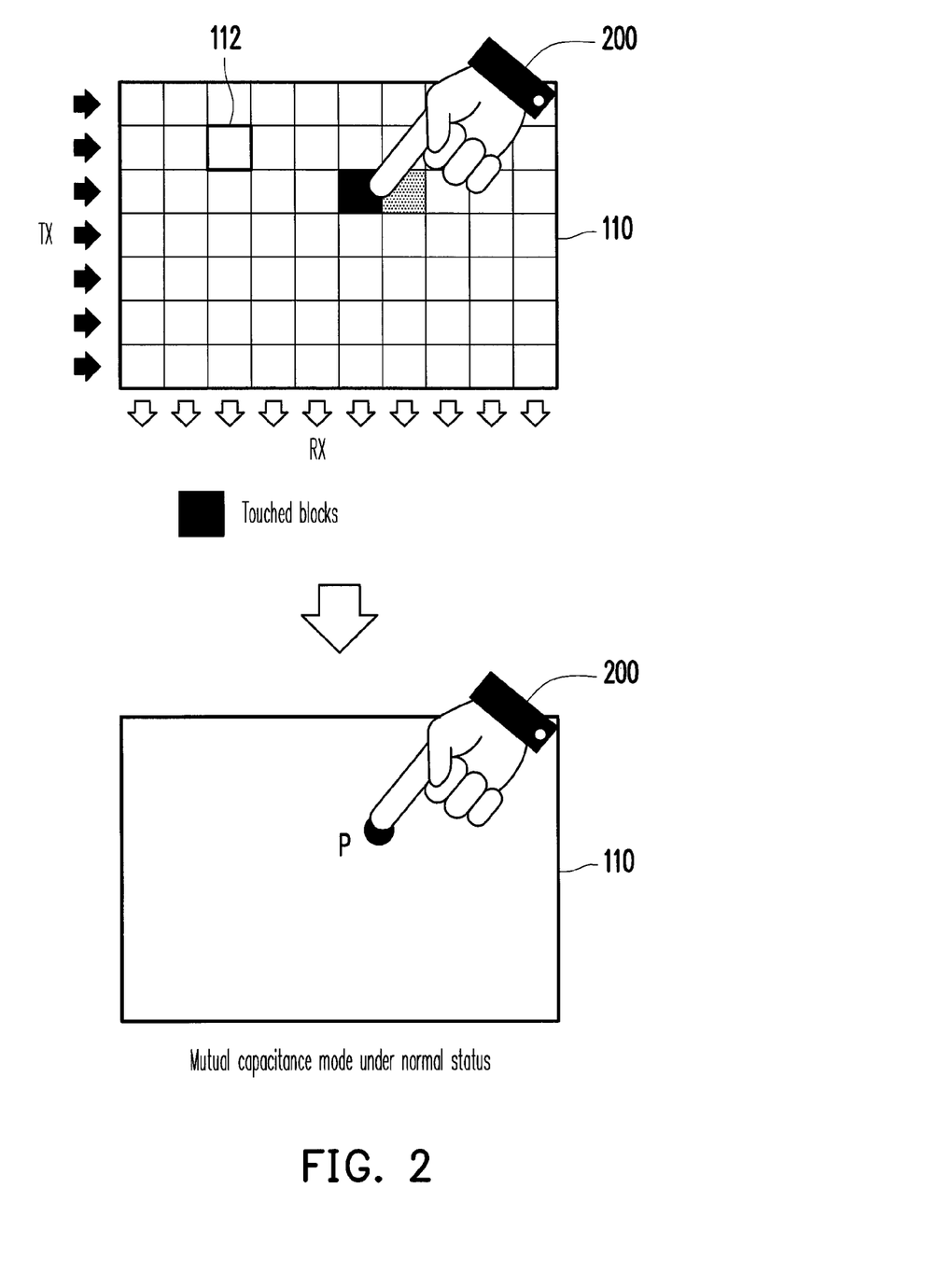
FIG. 2 shows a schematic diagram of the touch panel of the electronic apparatus working under a normal status according to an embodiment of the invention.

FIG. 2 shows a schematic diagram of the touch panel of the electronic apparatus working under a normal status according to an embodiment of the invention. Referring to FIG. 1 and FIG. 2, in the present embodiment, the touch panel 110 senses users' gestures in the mutual capacitance mode during the first period of the sensing frame. The touch panel 110 of the present embodiment includes a plurality of sensing blocks 112 for sensing a gesture 200 applied thereon. The touch panel 110 senses the gesture 200 based on capacitive variations of the sensing blocks 112 in a mutual capacitance mode. The touch panel 110 is driven by a plurality of scanning signals TX and outputs a plurality of sensing signals RX to the touch sensing controller 120. The touch sensing controller 120 determines a correct touch location P associated with the gesture 200 on the touch panel 110 based on the mutual-mode data which is obtained from the touch panel 110 sensing in the mutual capacitance mode. As shown in FIG. 2, the mutual-mode data shows the touched blocks associated with the gesture 200 are a black block and a neighboring gray block. When the electronic apparatus 100 works under the normal status, the touch sensing controller 120 properly determines that the touched blocks associated with the gesture 200 correspond to a correct touch location on the touch panel 110 based on the mutual-mode data. This way, no error touch locations are determined in the present embodiment.

Figure 3:
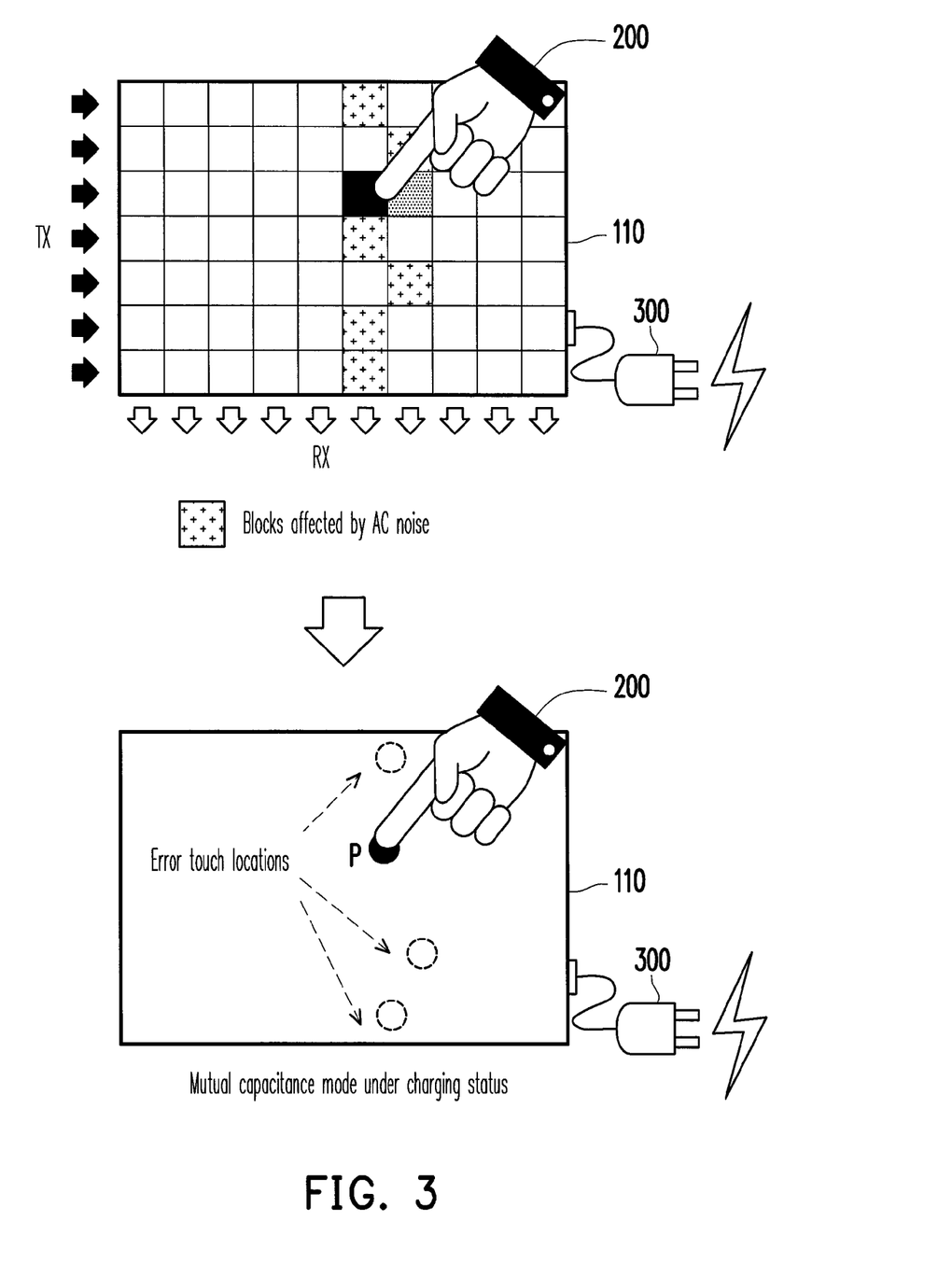
FIG. 3 shows a schematic diagram of the touch panel of the electronic apparatus working under a charging status according to an embodiment of the invention.

FIG. 3 shows a schematic diagram of the touch panel of the electronic apparatus working under a charging status according to an embodiment of the invention. Referring to FIG. 1 and FIG. 3, in the present embodiment, the touch panel 110 still senses users' gestures in the mutual capacitance mode. Under the charging status, the electronic apparatus 100 is connected to an alternating-current (AC) power supply 300 for battery charging. However, the AC power supply 300 easily brings AC noise into the touch sensing controller 120. That is to say, except for the touched blocks, other sensing blocks of the touch panel 110 are affected by the AC noise in the mutual capacitance mode and thus erroneously determined as the touched blocks. As a result, when the electronic apparatus 100 works under the charging status and senses in the mutual capacitance mode, the touch sensing controller 120 may erroneously determine that a plurality of sensing blocks correspond to the touch location associated with the gesture 200. Accordingly, error touch locations circled in dotted lines are determined due to the AC noise.

Figure 4:
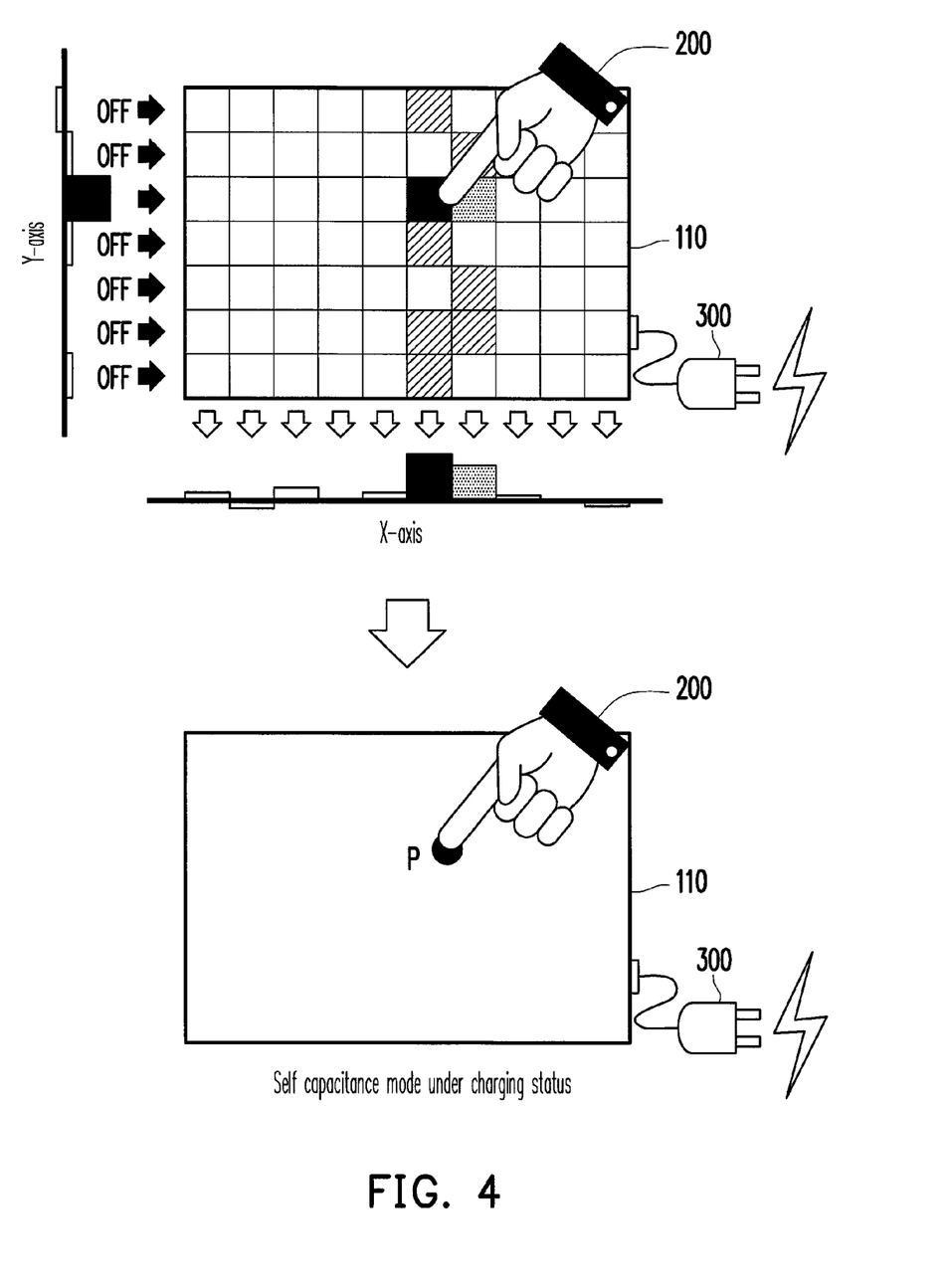
FIG. 4 shows a schematic diagram of the touch panel of the electronic apparatus working under the charging status according to another embodiment of the invention.

FIG. 4 shows a schematic diagram of the touch panel of the electronic apparatus working under the charging status according to another embodiment of the invention. Referring to FIG. 1 and FIG. 4, in the present embodiment, the touch panel 110 senses users' gestures in the self capacitance mode during the second period of the sensing frame. Similarly, during this period, the AC noise is also easily brought into the touch sensing controller 120 by the AC power supply 300 under the charging status. However, based on the property of self capacitance mode, even if AC noise is brought into the touch sensing controller 120, the touch sensing controller 120 still properly determines a correct touch location on the touch panel 110 for the touched blocks associated with the gesture 200. This way, no error touch locations are determined in the present embodiment.

Figure 5:
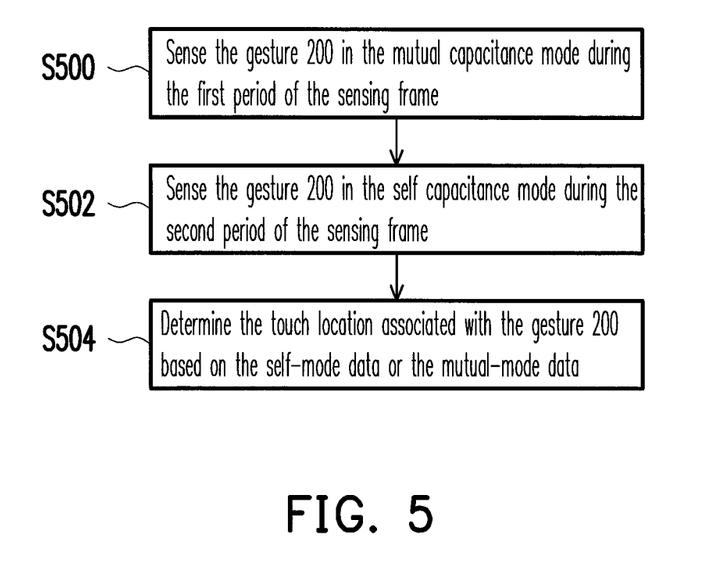
FIG. 5 shows a flowchart of the touch sensing method according to an embodiment of the invention.

FIG. 5 shows a flowchart of the touch sensing method according to an embodiment of the invention. Referring to FIG. 1A to FIG. 5, the touch sensing method of the present embodiment combines the self capacitance mode and the mutual capacitance mode for sensing users' gestures to prevent the touch controller 120 from reporting error touch locations. In step S500, the touch panel 110 first senses the gesture 200 applied thereon in the mutual capacitance mode during the first period of the sensing frame and then senses the identical gesture 200 in the self capacitance mode during the second period of the sensing frame in step S502. It should be noted that the order of sensing gestures in the self capacitance mode and in the mutual capacitance mode is exemplary, and the invention is not limited thereto. After receiving the self-mode data and the mutual-mode data during the sensing frame, the touch sensing controller 120 determines the touch location associated with the gesture 200 on the touch panel 110 based on the self-mode data or the mutual-mode data in step S504.

Figure 6:
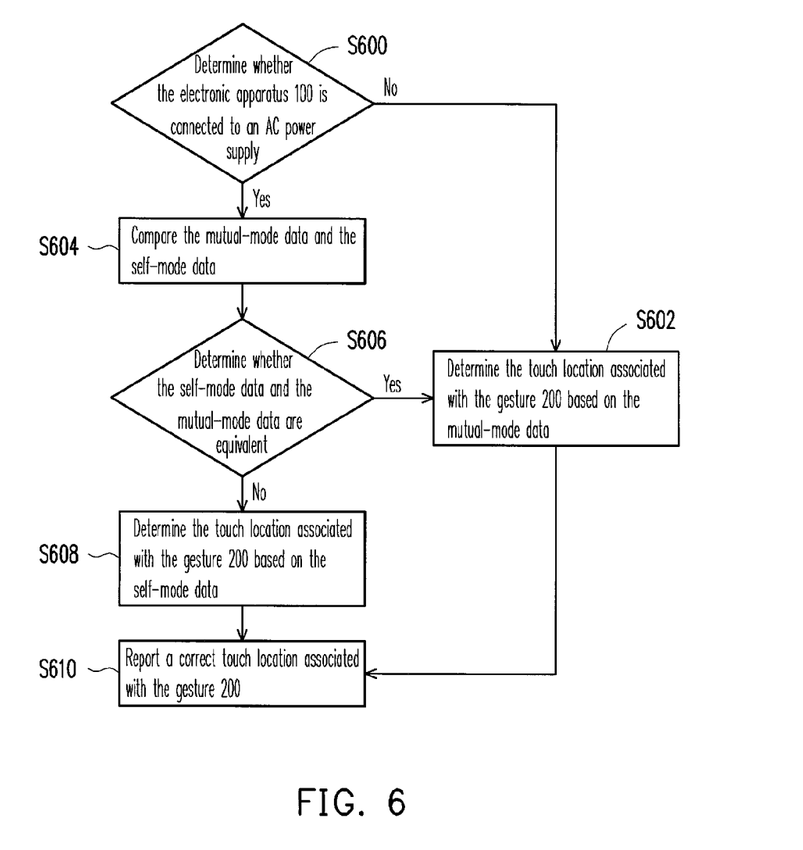
FIG. 6 shows a flowchart of the touch sensing method according to another embodiment of the invention.

FIG. 6 shows a flowchart of the touch sensing method according to another embodiment of the invention. Referring to FIG. 1A, FIG. 1B, and FIG. 6, in step S600, the touch sensing controller 120 determines whether the electronic apparatus 100 is connected to an AC power supply 300. If not, it represents that the electronic apparatus 100 works under the normal status, and thus, in step S602, the touch sensing controller 120 determines the touch location associated with the gesture 200 based on the mutual-mode data, which is obtained during the first period of the sensing frame. Next, the flow goes to step S610, and a correct touch location associated with the gesture 200 is reported.

If the electronic apparatus 100 is connected to the AC power supply, it represents that the electronic apparatus 100 works under the charging status. Under this status, the touch sensing controller 120 compares the mutual-mode data and the self-mode data in step S604, and then determines whether the self-mode data and the mutual-mode data are equivalent in step S606.

If the self-mode data and the mutual-mode data are equivalent, the flow goes to step S602, and then the touch sensing controller 120 still determines the touch location associated with the gesture 200 based on the mutual-mode data. Accordingly, the correct touch location associated with the gesture 200 is reported in step S610.

On the contrary, if the self-mode data and the mutual-mode data are not equivalent, it represents that the mutual-mode data is affected by the AC noise, and the mutual-mode data has some errors. In this situation, the flow goes to step S608, and the touch sensing controller 120 determines the touch location associated with the gesture 200 based on the self-mode data, which is obtained during the second period of the sensing frame. Accordingly, the correct touch location associated with the gesture 200 is reported in step S610. That is to say, the touch sensing controller 120 determines the touch location based on the self-mode data under the charging status, and thus ghost points, e.g. error touch locations circled in dotted lines as shown in FIG. 3, can be eliminated.

In summary, in the exemplary embodiments of the invention, the touch sensing method combines the self capacitance mode and the mutual capacitance mode during each sensing frame. Under different statuses, the touch controller determines the touch location associated with users' gestures based on data obtained in different modes to prevent from reporting error touch locations.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch sensing method, adapted for an electronic apparatus comprising a touch panel, the touch sensing method comprising:
    obtaining a mutual-mode data by sensing a gesture applied on the touch panel in a mutual capacitance mode during a first period of a sensing frame;
    obtaining a self-mode data by sensing the gesture applied on the touch panel in a self capacitance mode during a second period of the sensing frame; and
    after receiving the self-mode data and the mutual-mode data during the sensing frame, determining a touch location associated with the gesture on the touch panel by comparing the self-mode data with the mutual-mode data,
    determining whether the electronic apparatus is connected to an alternating-current (AC) power supply,
    wherein if the electronic apparatus is connected to the AC power supply, the touch sensing method further comprising:
    determining whether the self-mode data and the mutual-mode data are equivalent,
    wherein if the self-mode data and the mutual-mode data are not equivalent, then determining the touch location associated with the gesture on the touch panel is based on the self-mode data.

2. The touch sensing method as claimed in claim 1, wherein the first period is longer that the second period in the sensing frame.

3. The touch sensing method as claimed in claim 1, further comprising:
    wherein if the electronic apparatus is not connected to the AC power supply, determining the touch location associated with the gesture on the touch panel is based on the mutual-mode data.

4. The touch sensing method as claimed in claim 1, further comprising:
    wherein if the self-mode data and the mutual-mode data are equivalent, then determining the touch location associated with the gesture on the touch panel is based on the mutual-mode data.

5. An electronic apparatus, comprising
    a touch panel comprising a plurality of sensing blocks, sensing a gesture applied thereon based on capacitive variations of the sensing blocks,
    wherein the touch panel senses the gesture applied on the touch panel in a mutual capacitance mode during a first period of a sensing frame and senses the gesture applied on the touch panel in a self capacitance mode during a second period of the sensing frame; and
    a touch sensing controller connected to the touch panel and determining a touch location associated with the gesture on the touch panel by comparing the self-mode data with the mutual-mode data after receiving the self-mode data and the mutual-mode data during the sensing frame,
    wherein the touch sensing controller further determines whether the electronic apparatus is connected to an alternating-current (AC) power supply,
    wherein if the electronic apparatus is connected to the AC power supply, the touch sensing controller determines whether the self-mode data and the mutual-mode data are equivalent, and
    wherein if the self-mode data and the mutual-mode data are not equivalent, the touch sensing controller determines the touch location associated with the gesture on the touch panel based on the self-mode data.

6. The electronic apparatus as claimed in claim 5, wherein the first period is longer than the second period in the sensing frame.

7. The electronic apparatus as claimed in claim 5, wherein if the electronic apparatus is not connected to the AC power supply, the touch sensing controller determines the touch location associated with the gesture on the touch panel based on the mutual-mode data.

8. The electronic apparatus as claimed in claim 5, wherein if the self-mode data and the mutual-mode data are equivalent, the touch sensing controller determines the touch location associated with the gesture on the touch panel based on the mutual-mode data.

* * * * *